United States Patent
Gerads et al.

(12) 
(10) Patent No.: US 6,212,964 B1
(45) Date of Patent: Apr. 10, 2001

(54) FLEXIBLE LINK VARIABLE STROKE APPARATUS

(75) Inventors: Lyle J. Gerads, Clearwater; Robert Fetrow, Fridley; Kevin Dodds, Plymouth, all of MN (US)

(73) Assignee: Zero-Max, Inc., Minneapolis, MN (US)

( * ) Notice: Subject to any disclaimer, the term of this patent is extended or adjusted under 35 U.S.C. 154(b) by 0 days.

(21) Appl. No.: 09/589,474

(22) Filed: Jun. 7, 2000

Related U.S. Application Data (63) Continuation of application No. 09/271,798, filed on Mar. 18, 1999, now Pat. No. 6,122,982.

(51) Int. Cl.$^7$ ................................................. F16H 29/00
(52) U.S. Cl. ................................................. 74/125.5
(58) Field of Search .................................. 74/125.5, 117, 74/118

(56) References Cited

U.S. PATENT DOCUMENTS

| | | |
|---|---|---|
| 2,950,623 | 8/1960 | Weber et al. . |
| 3,004,440 | 10/1961 | Pernik . |
| 3,340,743 | 9/1967 | Stageberg . |
| 3,714,837 | 2/1973 | Jensen et al. . |
| 4,091,684 | 5/1978 | Lehmann . |
| 4,112,778 | 9/1978 | Korosue . |
| 4,242,050 | 12/1980 | Oakes . |
| 5,771,743 | 6/1998 | Menzi . |

FOREIGN PATENT DOCUMENTS

| | | |
|---|---|---|
| 0133187 | 2/1985 | (EP) . |
| 1201921 | 1/1960 | (FR) . |

*Primary Examiner*—Dirk Wright
(74) *Attorney, Agent, or Firm*—Merchant & Gould P.C.

(57) ABSTRACT

The present disclosure relates to a flexible link drive apparatus. The flexible link drive apparatus comprises a housing that supports an input shaft and an output shaft. An eccentric is located on the input shaft, and a clutch is located on the output shaft. The present disclosure further comprises an adjustable flexible member that has a fixed end coupled to the housing through an adjustable flexible member wherein the eccentric on the input shaft deflects the adjustable flexible member to alter a degree of rotation of the clutch located on the output shaft. The present disclosure additionally relates to a method of providing variable speed power transmission by a flexible link drive apparatus. The method comprises the steps of providing a housing that supports an input shaft and an output shaft. Further, the method comprises the steps of deflecting an adjustable flexible member by an eccentric located on the input shaft which alters a degree of rotation of a clutch located on the output shaft.

21 Claims, 7 Drawing Sheets

FLEXIBLE LINK VARIABLE STROKE APPARATUS

This application is a continuation of Ser. No. 09/271,798 filed Mar. 18, 1999, now U.S. Pat. No. 6,122,982.

TECHNICAL FIELD

This invention generally relates to an apparatus for mechanically adjusting the output speed of a flexible link variable stroke drive. More particularly, this invention relates to a flexible link variable stroke drive that has an adjustable range of output speeds from a constant input speed.

BACKGROUND

Variable stroke drives are used on a wide variety of machinery. A variable stroke drive may be used as a primary or secondary drive apparatus on various applications, for example, in the agricultural, metalworking, packaging, paper converting, sewing, and material handling industries.

In the textile industry, loom manufacturers use variable stroke drives as let-off mechanisms. The variable stroke drive controls the speed at which warp yarns are released. Further, the variable stroke drive maintains constant tension on the yams and, in effect, eliminates the need for a separate motor on the loom. Another example of an application for the variable stroke drive is in the food processing industry. A variable stroke drive may be used on a food press machine. The variable stroke drive controls the speed of a conveyor that proportions, forms, and stacks food products on a conveyor assembly. A further example of an application for a variable stroke drive is in the printing industry. Variable stroke drives may be used to control a high speed sheeter that controls the speed of stacking finished sheets after printing, and a separate variable stroke drive controls the cut-to-length of the paper sheets. Another example of an application for a variable stroke drive is on a grain dryer. The variable stroke drive controls the auger speed that circulates grain for proper, uniform drying.

There are numerous patents that disclose the concept of a variable speed power transmission apparatus. Two examples of variable stroke drives are shown in U.S. Pat. No. 2,950,623 (the '623 patent), issued to J. A. Weber, et al., and U.S. Pat. No. 3,340,743 (the '743 patent) issued to S. O. Stageberg.

The '623 patent discloses a drive mechanism having an input shaft that carries a crank arm. A first end of a chain is attached to the crank arm. Additionally, a first end of a spring is attached to the crank arm. The chain passes around a gear that is attached to an output shaft through a one-way clutch that includes a ratchet wheel and a pawl. The second end of the chain is attached to a second end of a spring. The spring wraps around a groove of a pulley member. The driving of the input shaft is intermittent and the amount of rotating may be controlled by the position of attachment on the crank arm to make longer or shorter the effective length of the crank arm in its operation of the driving mechanism of the invention. This invention discloses a variable eccentric that does not allow for greater output speed and output torque capabilities. Further, the patent discloses a constant driving mechanism with no new speed capacity. In addition, the '623 system is not capable of being adjusted while the input shaft is rotating, and it is an incremental indexing drive system and not a variable speed drive. Moreover, the '623 system does not provide a greater ratio of input to output speed to the extent that an overdrive is obtained.

The '743 patent discloses a variable speed power transmission. In this device, there are several belts or links. A single eccentric is mounted on an input shaft. The output shaft is connected to an overriding clutch. The device includes an arm that is usable to vary the amount of contact between the eccentric and belt or belts. A single eccentric comes into integral contact with a belt that urges a clutch disk to a first position to move an output shaft. A spring is connected directly to a clutch disk to return the clutch disk to an original position. The spring assembly is directly connected to the clutch disk. This arrangement creates a diminished angle of travel for the clutch disk, and in accord, this produces a lesser output shaft rotation. The '743 patent discloses a single eccentric with a 90° phase angle differential between eccentrics. The single eccentric utilized transmits a relatively low speed to the output shaft. Further, the system of the '743 patent does not utilize a free-floating spring assembly in order to provide greater speed range for industrial applications. Moreover, the '743 system does not provide a greater ratio of input to output speed to the extent that an overdrive is obtained.

Therefore, a need exists for an improved apparatus that is capable of having a greater input to output ratio of rotation. A need exists for an improved apparatus that offers the capability of obtaining zero speed while the apparatus is operational. A related need is an apparatus that can be adjusted while the apparatus is operational or idle. A related need exists for a fixed length eccentric that utilizes a dual-eccentric transmission unit. Further, there is a need for a dual-eccentric transmission unit that has a 45° phase angle differential between eccentric units. Last, there is a need for a free-floating spring assembly in order to provide greater speed ratio for industrial applications.

SUMMARY OF THE INVENTION

In one embodiment, the present invention comprises a flexible link drive apparatus. The flexible link drive apparatus comprises a housing that supports an input shaft and an output shaft. An eccentric is located on the input shaft, and a clutch is located on the output shaft. The flexible link drive apparatus further comprises an adjustable flexible member, wherein the eccentric on the input shaft deflects the adjustable flexible member to alter a degree of rotation of the clutch located on the output shaft.

In a further embodiment of the present invention, a method of providing variable speed power transmission by a flexible link drive apparatus is provided. The method comprises the steps of providing a housing that supports an input shaft and an output shaft. Further, the method comprises the steps of deflecting an adjustable flexible member by an eccentric located on the input shaft which alters a degree of rotation of a clutch located on the output shaft.

BRIEF DESCRIPTION OF THE DRAWINGS

The organization and manner of the structure and operation of the invention, advantages thereof, may best be understood by reference to the following description, taken in connection with the accompanying drawings, wherein like reference numerals identify like elements throughout the views, in which.

DETAILED DESCRIPTION OF THE PREFERRED EMBODIMENT

In the description of the preferred embodiment, reference is made to the accompanying drawings that form a part hereof and in which is shown by way of illustration a specific embodiment in which the invention may be practiced. It should be understood that other embodiments may be utilized as structural changes may be made without departing from the scope of the present invention.

In general terms, the present system is directed to a flexible link variable stroke drive that has an adjustable range of output speeds. One embodiment includes a dual-eccentric roller flexible link drive with a free-floating biasing member in order to provide an enhanced input-to-output speed ratio.

The system disclosed has many advantages. For example, the present system is capable of high input-to-output ratios of rotation. Additionally, the present system has the capability of obtaining zero speed while the system is operational or idle. Further, the system disclosed is able to be adjusted while the invention is operational.

Yet another advantage of the present system is that it has a fixed length eccentric that utilizes a dual-eccentric transmission unit. In relation to the input speed of a single eccentric versus a dual-eccentric, a dual-eccentric transmission unit allows for an increased ratio of contact between the rollers and the adjustable flexible member. The increased ratio of contact between the rollers and the adjustable flexible member provides a greater output to input speed, thereby creating an overdrive transmission unit.

Another advantage of a preferred embodiment is that the dual-eccentric transmission unit has a 45° phase angle differential between eccentric units, thus allowing for more contacts with the adjustable flexible member and, therefore, greater output speed. Further, the present system utilizes a free-floating spring assembly in order to provide a greater angle of travel for a clutch, in order to produce a greater output shaft rotation.

Figure 1:
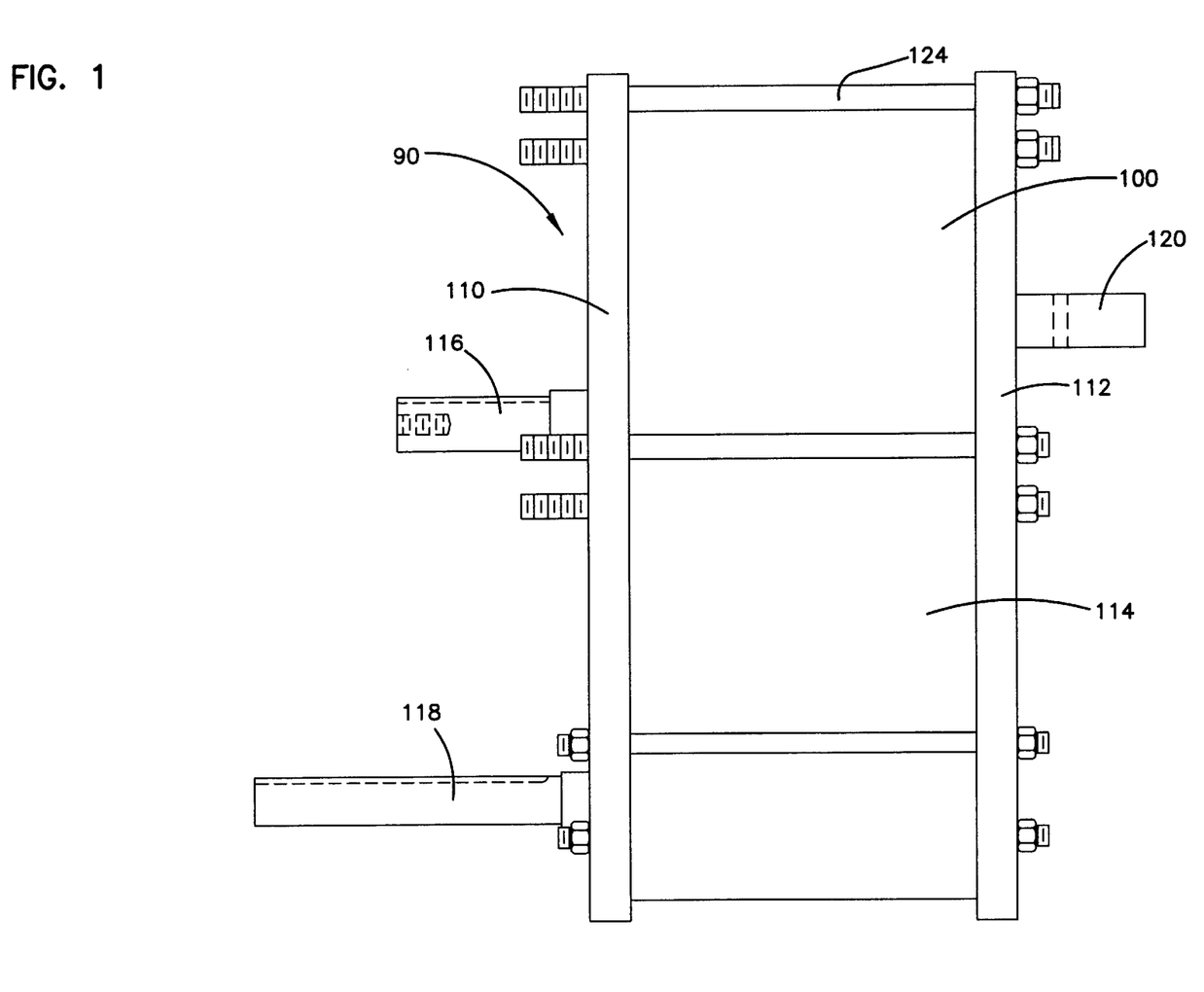
FIG. 1 is a top view showing the housing unit of the flexible link variable stroke apparatus.

Referring to FIG. 1, a flexible link variable stroke drive 90 is generally shown driven by a rotational power source, such as a motor or other suitable power source. The drive 90 may be adapted to be mounted to the frame of any type of machinery that utilizes a flexible link variable stroke drive 90.

The exterior of the flexible link variable stroke drive 90 is generally referred to as a housing 100. The housing in the embodiment shown has a first endplate 110, a second endplate 112, and an encasing plate 114. The housing rotationally supports an input shaft 116, an output shaft 118, and a control shaft 120. The armature of the motor or other rotational power source may have a key that is adapted to be coupled to the keyway of the input shaft 116. The output shaft 118 of the drive 90 may be adapted to be coupled to a pulley, shaft or other similar device.

The first 100 and second endplates 112 may have an endplate channel 122 (shown schematically in FIG. 2) located about the periphery of the first 110 and second endplates 112. The endplate channel 122 may be adapted to engage the encasing plate 114. In the embodiment shown, the first 110 and second 112 endplates in conjunction with the encasing plate 114 are rigidly coupled by a plurality of evenly spaced threaded securing rods 124 displaced throughout the periphery of the first 110 and second 112 endplates.

Figure 2:
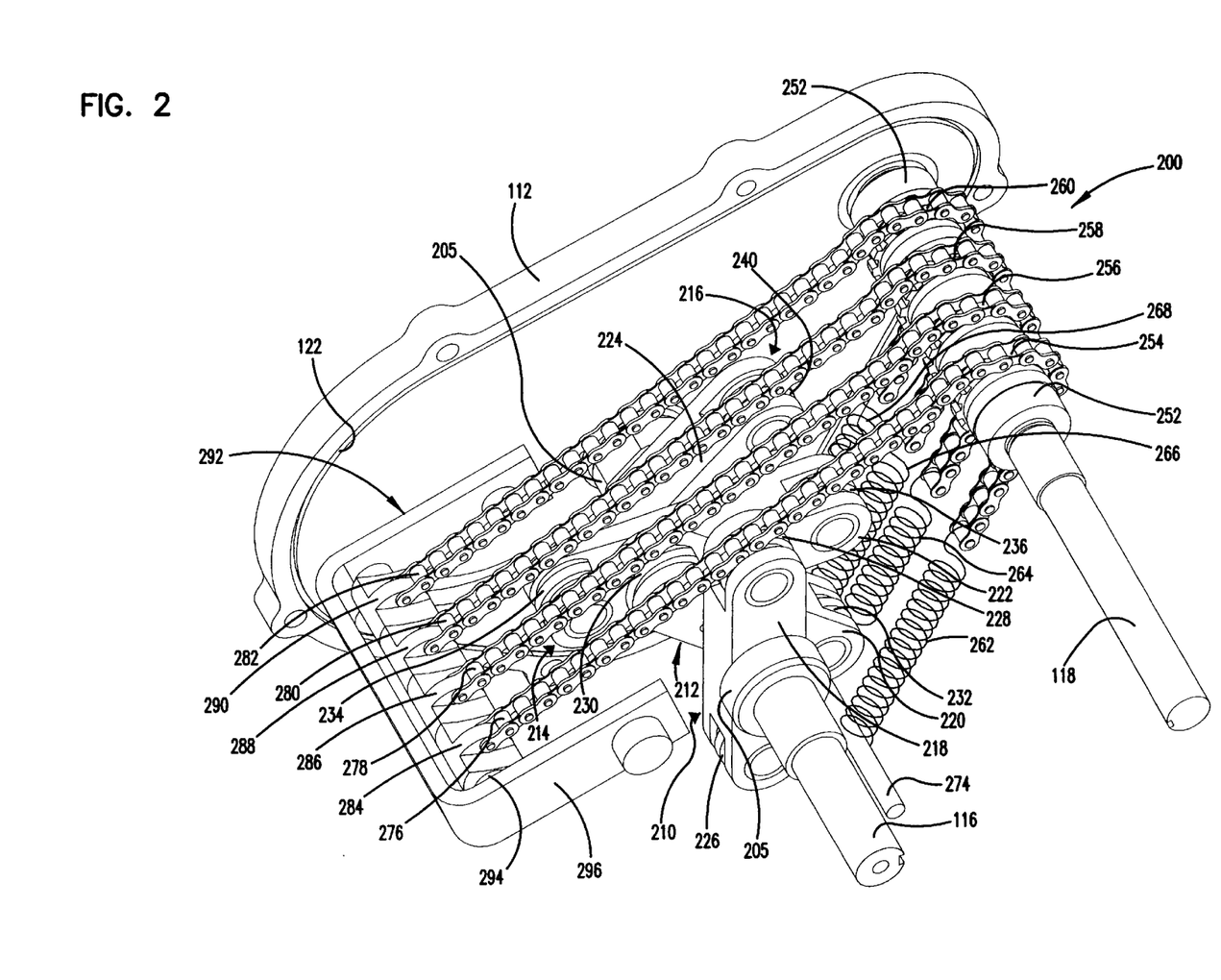
FIG. 2 is a perspective view of the flexible link variable stroke apparatus.
Figure 3:
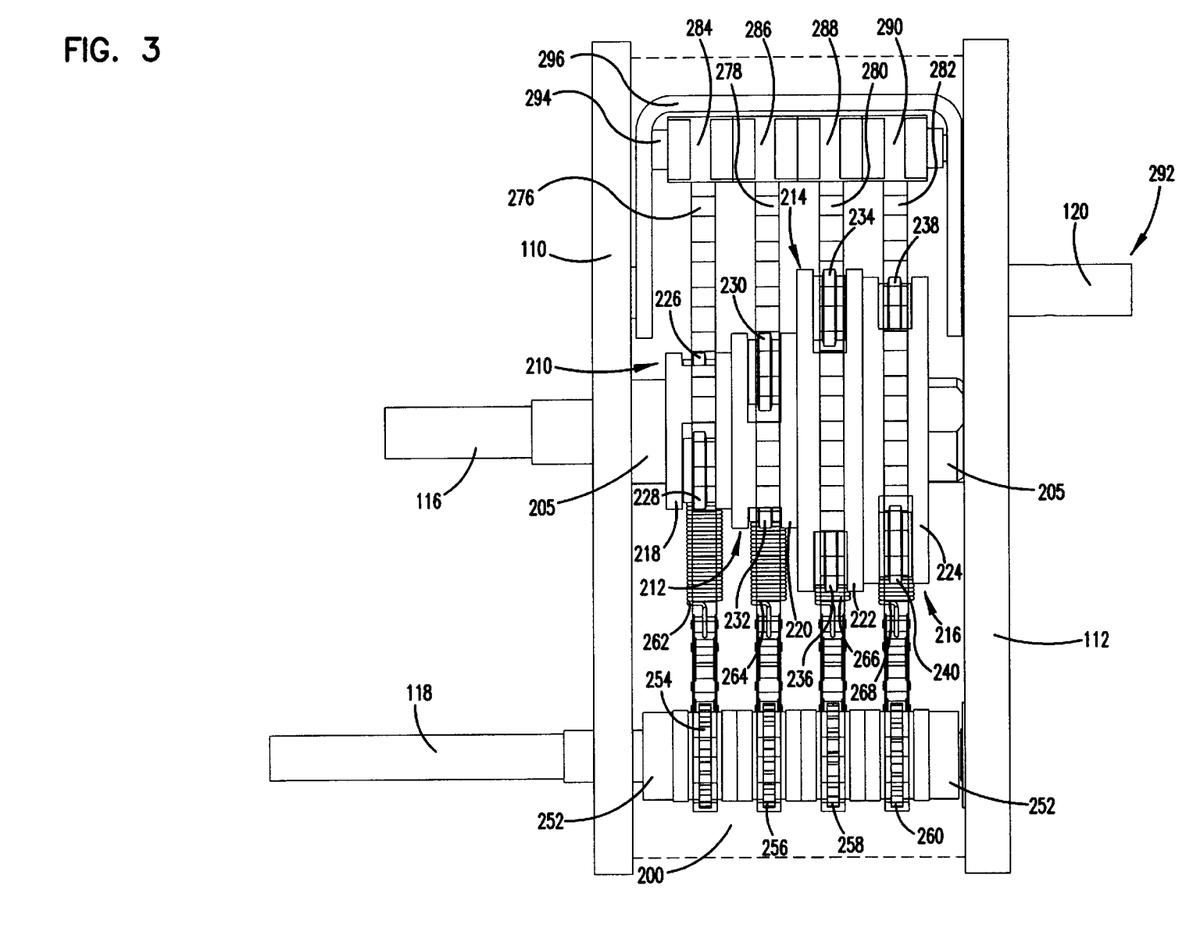
FIG. 3 is a top view of the flexible link variable stroke apparatus.

Referring to FIGS. 2 and 3, the internal structure of the flexible link variable stroke drive is generally shown as 200. The input shaft 116 is mounted between the first 110 and second 112 endplates. The input shaft 116 is shown supported by the input bearings 205 mounted in the first 110 and second 112 endplates. In the embodiment shown, the input shaft 116 has four eccentrics 210, 212, 214, and 216 that are fixedly mounted by an interference fit. Each eccentric 210, 212, 214 and 216 may comprise an elongated bar 218, 220, 222 and 224, as well as the input rollers 226, 228, 230, 232, 234, 236, 238, and 240 that are coupled to each respective elongated bar 218–224. Since each eccentric may be of similar construction, the eccentric 210 will be explained in detail for convenience. The eccentric 210 is shown having an elongated bar 218 that has a first input roller 226 that is journaled between a first end of the elongated bar 218 that supports the bearings of the first input roller 226. Opposite the first input roller 226 is a second input roller 228 that is journaled between a second end of the elongated bar 218 that supports the bearings of the second input roller 228. The input rollers 226 and 228 have a bearing surface for engagement with the adjustable flexible member 276.

Figure 4:
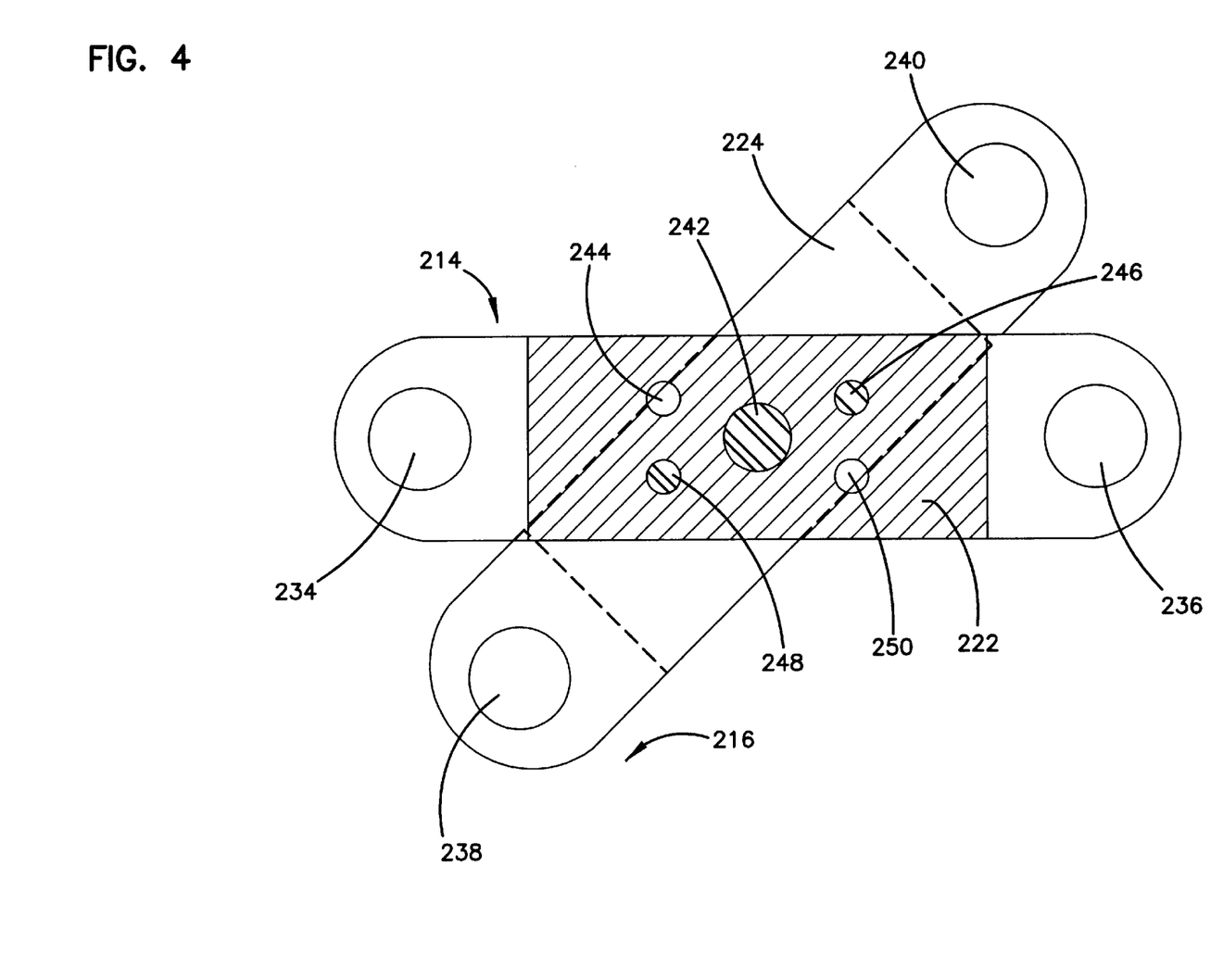
FIG. 4 is a cross-section view of the eccentrics.

In the embodiment shown in FIG. 4, each eccentric 210–216 are fixedly connected by an internal rod 242 through the center of each eccentric. The eccentrics 210–216 are configured in a 45° phase angle differential. Thus, the input rollers 226–240 connect the adjustable flexible members 276, 278, 280, and 282 at 45° phase angle differentials. The eccentric may be indexed through an indexing hole pattern on each eccentric. The indexing hole pattern shown for each has four slots 244, 246, 248, and 250. The eccentrics 210–216 may be configured by having the slots 246 and 248 correspondingly aligned between the eccentrics 214 and 216, thus creating a 45° angle or index between the input rollers 236 and 240, and the input rollers 234 and 238. Additionally, this configuration creates a 135° angle or index between the input rollers 236 and 238, and the input rollers 234 and 240. A pin may be inserted through the corresponding slots 246 and 248 for a permanent configuration. The eccentrics 210 and 212 are adapted to be configured similar to the eccentrics 214 and 216. Therefore, upon the configuration of the eccentrics 210–216, there is a 45° phase angle differential present in the system between the input rollers 226–240. Two pins may be threaded onto the internal rod 242 for a permanent 45° angle configuration of the eccentrics 210–216.

Referring back to FIGS. 2 and 3, the output shaft 118 is mounted between the first 110 and second 112 endplates. The output shaft 118 may be supported by output bearings 252 mounted in the first 110 and second 112 endplates. The output shaft 118 has four clutches 254, 256, 258, and 260 that are fixedly mounted. The clutches 254–260 utilize a sprocket construction for the transmission of rotational speed from the input shaft 116 to the output shaft 118. In the preferred embodiment, the clutches 254–260 arc one-way clutches. The one-way sprocket clutch assembly is well known to one skilled in the art, and any other suitable clutch could be utilized with the present invention.

The clutches 254–260 may be configured in conjunction to oscillate and drive the output shaft 118 in alternate oscillation movements from a zero to an infinitely adjustable output speed. The clutches 254–260 may be biased by the biasing members 262, 264, 266, and 268 or tension springs. The ends of the biasing members 262–268 may be attached to a biasing member anchor 274. The biasing member anchor 274 may be supported and integrally disposed between the first 110 and second 112 endplates.

Biasing members 262–268 may be mounted on the biasing member anchor 274 in a free-floating manner for the production of a greater stroke and ultimately a higher output speed. Opposite ends of the biasing members 262–268 are attached to adjustable flexible members 276–282, respectively. The clutches 254–260 may be rotated in a driving stroke by the adjustable flexible members 276–282. The opposite end of the adjustable flexible members 276–282 are connected to the adjustable flexible member anchors 284, 286, 288, and 290.

The flexible link variable stroke drive further includes a speed control device 292. The speed control device 292 includes a cross shaft 294, control yoke 296, and a control shaft 120. Further, the control device 292 may be adapted to be coupled to a rotation lever or other similar device for rotatably or linearly actuating the speed control device 292. The control shaft 120 may be operatively connected to the C-shaped control yoke 296. The control yoke 296 may be fixedly coupled to the cross shaft 294. The cross shaft 294 is disposed within the control yoke 296. The series of four flexible connection anchors 284, 286, 288, and 290 are pivotally coupled to the cross shaft 294. A spacer on the cross shaft 294 allows the adjustable flexible members 276–282 to be evenly displaced on the control shaft 120. The speed control device 292 may be configured in the specified manner in order to control the engagement of the adjustable flexible members to the eccentric input rollers.

Figure 5A:
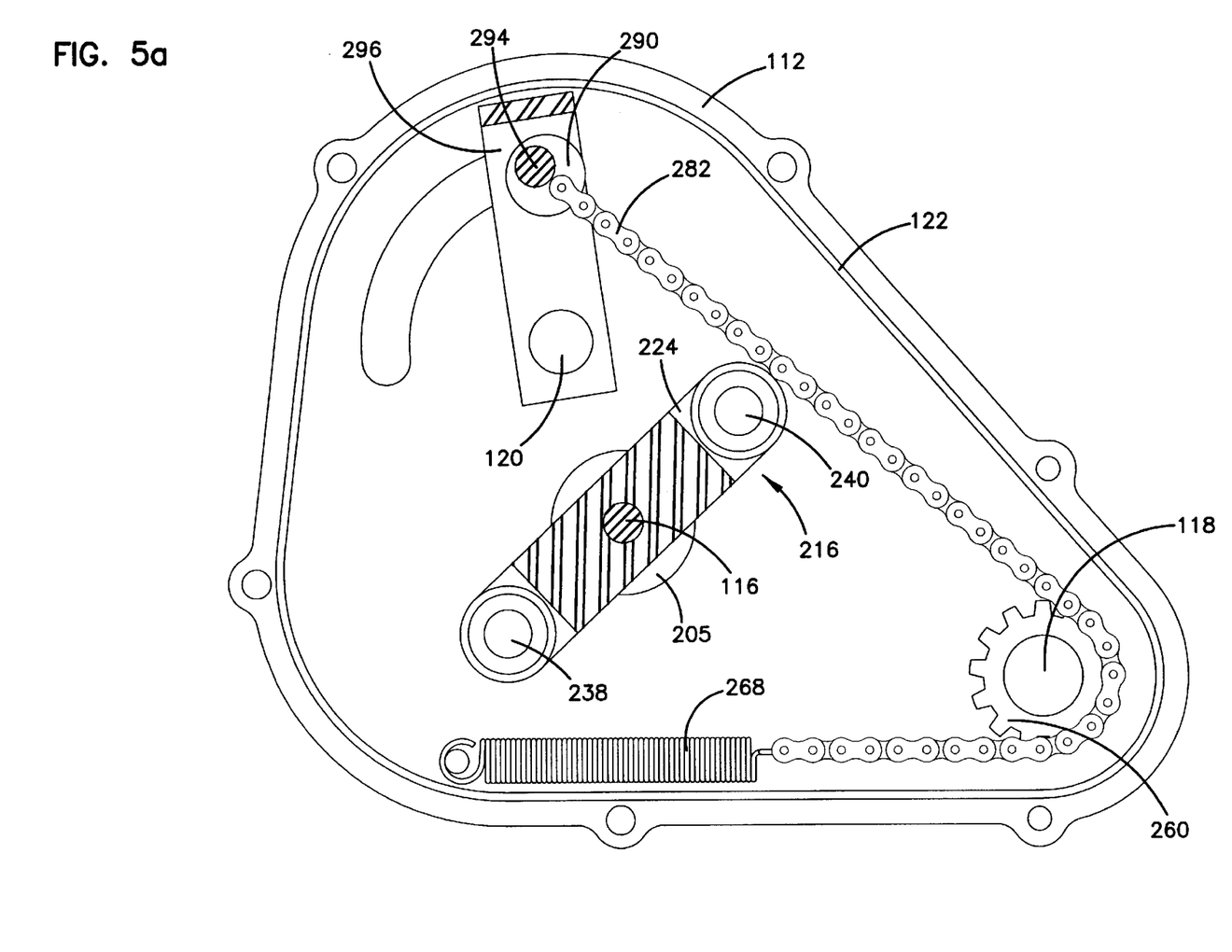
FIG. 5a is side view of the speed control device in a non-contacting position relative to an adjustable flexible member.
Figure 5B:
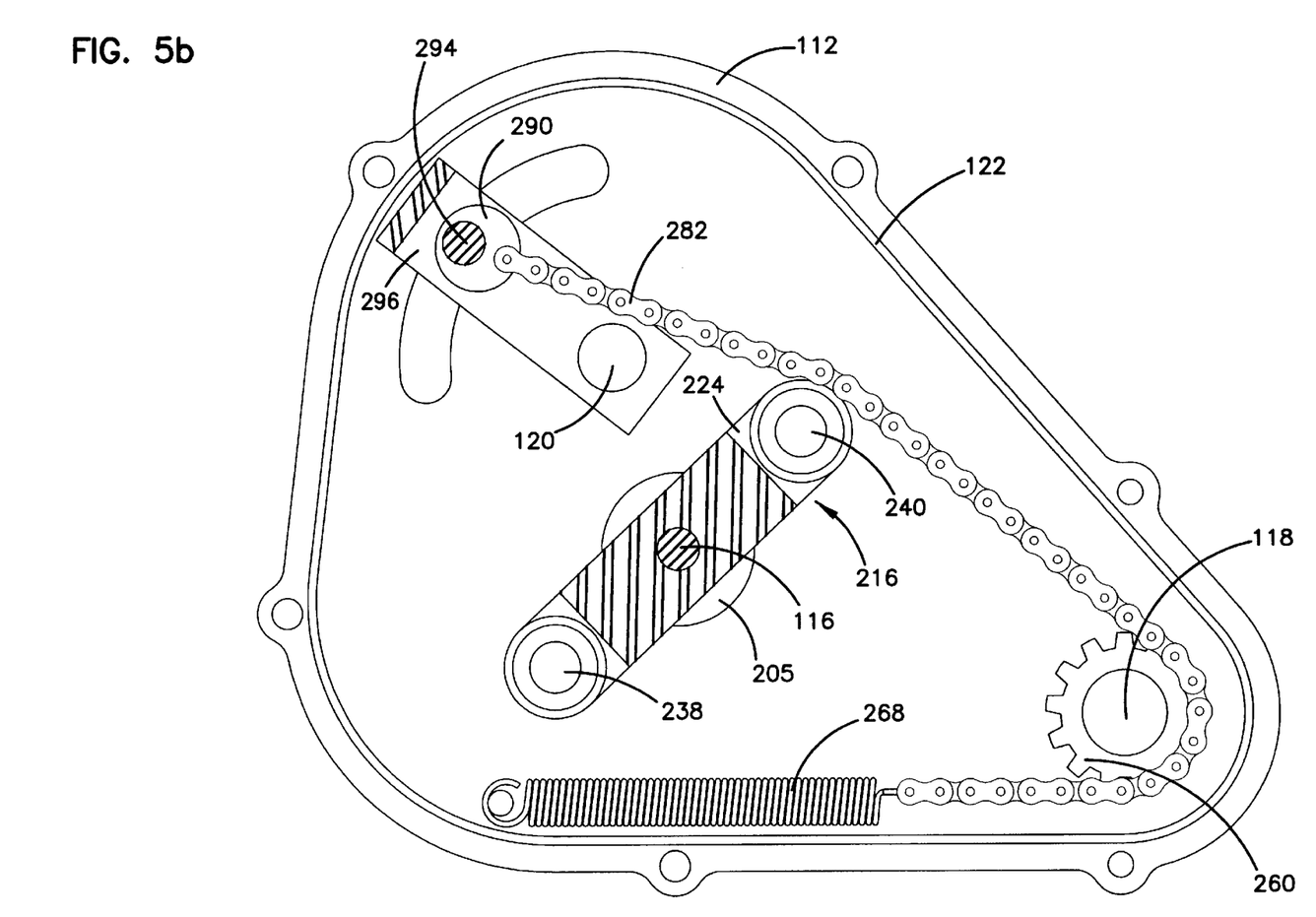
FIG. 5b is a side view of the speed control device in a intermediate contacting position relative to an adjustable flexible member.
Figure 5C:
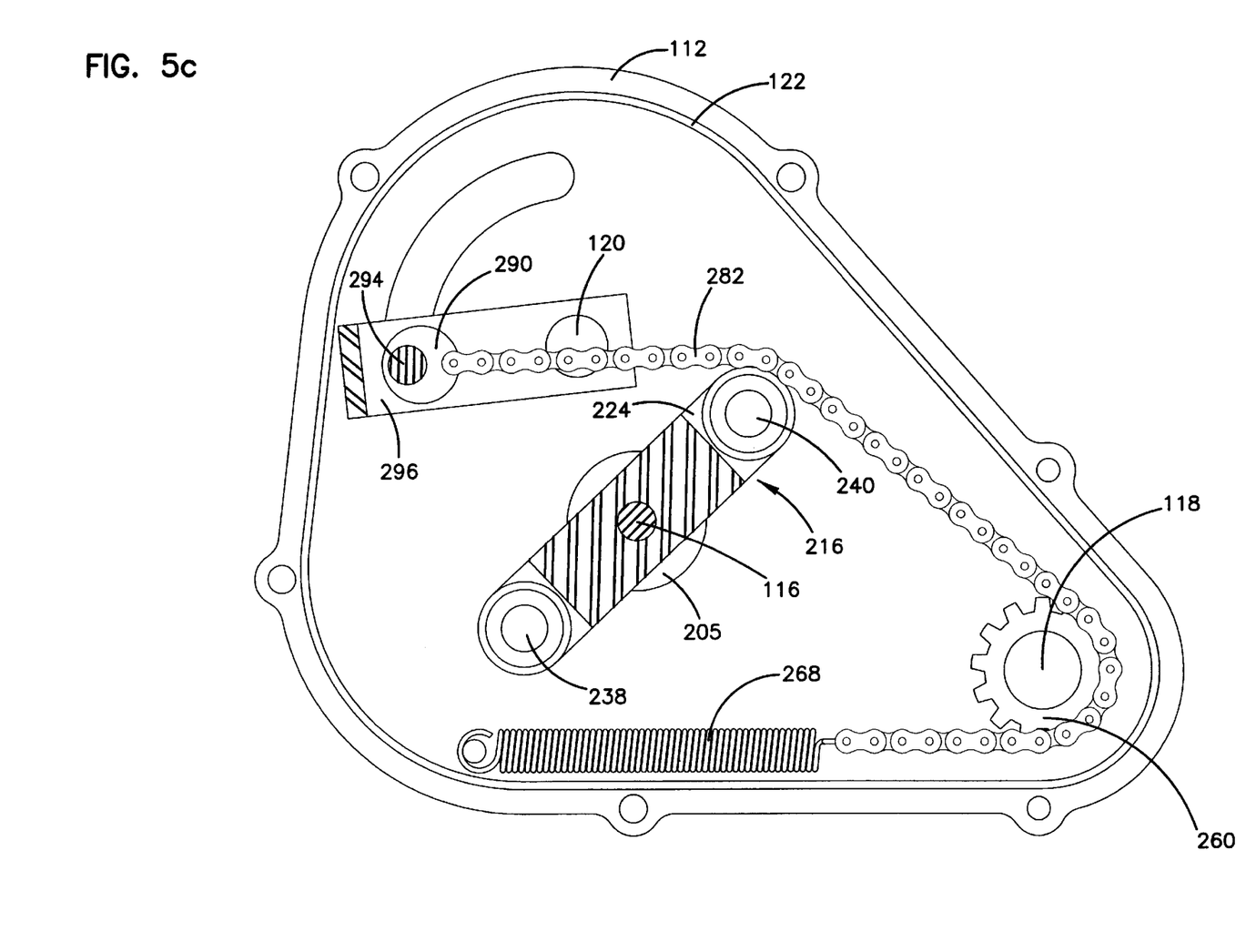
FIG. 5c is a side view of the speed control device in a fully contacting position relative to an adjustable flexible member.

Referring to FIGS. 5a, 5b, and 5c, the speed control device 292 is shown in various positions corresponding to a plurality of output speeds. In FIG. 5a, the speed control device 292 is shown at a position of corresponding zero output speed. In FIG. 5b, the speed control device 292 is shown at a position of corresponding intermediate output speed. In FIG. 5c, the speed control device 292 is shown at a position of maximum output speed.

By way of the control shaft 120, the control yoke 296 may be pivotable in relation to having the adjustable flexible members 276–282 come into more or less contact with the input rollers, 226–240, respectively. The movement of the control yoke 296, effectuates either no deflection (as seen in FIG. 5a) or maximum deflection (as seen in FIG. 5c) of the adjustable flexible members 276–282 by the input rollers 226–240. Additionally, the movement of the control yoke 296, effectuates a corresponding change in speed and length of stroke of the clutches 254–260.

Utilizing the inside face of the second endplate 112 as a point of reference, when the control yoke 296 is pivoted in the counterclockwise direction, it may move the cross shaft 294 in a direction that effectuates increased contact between the adjustable flexible members 276–282 and the input rollers 226–240. Further, utilizing the inside face of the second endplate 112 as a point of reference, when the control yoke 296 is pivoted in the clockwise direction, it may move the cross shaft 294 in a direction that effectuates decreased contact between the adjustable flexible members 276–282 and the input rollers 226–240.

Subsequently, because the motion of each eccentric may be similar, the motion of the eccentric 210 in conjunction with corresponding assemblies will be explained in detail. Referring to the eccentric 210, as the input shaft 116 rotates, the input rollers 226 and 228 displace the adjustable flexible member 276. The displacement of the adjustable flexible member 276 causes the clutch 254 to oscillate in a first direction and apply a tension force to the biasing member 262, thereby initiating movement of the biasing member 262 from its natural state. Further, the displacement of the adjustable flexible member 276 drives the clutch 254 as it initiates movement of the output shaft 118 in a rotational direction.

As the input shaft 116 continues to rotate, there may be a gradual decrease in engagement of the input rollers 226 and 228 with the adjustable flexible member 276. Specifically referring to the engagement of the input roller 226 with the adjustable flexible member 276, at the period in time when the input roller 226 ceases contact with the adjustable flexible member 276, the biasing member 262 returns the clutch 276 on the output shaft 118 back to its original position. Moreover, when the adjustable flexible member 276 leaves contact with the input roller 226, the adjacent adjustable flexible member 278 continues the identical motion of rotational and transitional motion. This process continues eight times per revolution giving a smooth continuous rotation of the output shaft.

The foregoing description of the present invention has been presented for purposes of illustration and description, and is not intended to be exhaustive or to limit the invention to the precise form disclosed. The description was selected to explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

The claimed invention is:

1. A flexible link drive apparatus comprising:
   a housing supporting an input shaft and an output shaft;
   an eccentric located on the input shaft;
   a clutch located on the output shaft; and
   an adjustable flexible member, wherein the eccentric on the input shaft deflects the adjustable flexible member to alter a degree of rotation of the clutch located on the output shaft.

2. The flexible link drive apparatus of claim 1, wherein the eccentric comprises at least one input roller.

3. The flexible link drive apparatus of claim 1, wherein the adjustable flexible member has a fixed end coupled to the housing through an adjustable flexible member anchor and a free end coupled to the housing through a biasing member, wherein the coupling of the free end of the adjustable flexible member to the housing by the biasing member causes an enhanced angle of travel for the clutch and produces an enhanced output shaft rotation.

4. The flexible link drive apparatus of claim 2, further comprising a speed control device, wherein the speed control device controls the amount of engagement of the adjustable flexible member to the input roller.

5. The flexible link drive apparatus of claim 4, wherein the speed control device comprises a control shaft operatively connected to a control yoke, a cross shaft disposed within the control yoke, and an adjustable flexible member anchor pivotally coupled to the cross shaft, wherein the rotation of the control shaft alters the relative position of the speed control device in relation to the input roller.

6. The flexible link drive apparatus of claim 1, wherein the housing comprises a first endplate, a second endplate, and an encasing plate for enclosing the flexible link drive apparatus.

7. The flexible link drive apparatus of claim 6, wherein the input shaft is mounted between the first and the second endplate at an input location, and the output shaft is mounted between the first and the second endplate at an output location.

8. The flexible link drive apparatus of claim 1, wherein the eccentric comprises an elongated bar, a first roller, and a second roller, the first roller being rotatably coupled proximate the end of the elongated bar, and the second roller being rotatably coupled proximate an opposite end of the elongated bar.

9. The flexible link drive apparatus of claim 8, wherein a plurality of eccentrics are coupled to the input shaft.

10. The flexible link drive apparatus of claim 9, wherein the plurality of eccentrics are coupled at a 45° phase angle differential.

11. The flexible link drive apparatus of claim 8, wherein the first and second rollers have a bearing surface that engages the adjustable flexible member.

12. The flexible link drive apparatus of claim 1, wherein a plurality of clutches are located on the output shaft.

13. The flexible link drive apparatus of claim 1, wherein the clutch is oscillatable in a first direction and in an opposite second direction.

14. The flexible link drive apparatus of claim 13, wherein the clutch has a sprocket surface for engaging the adjustable flexible member.

15. The flexible link drive apparatus of claim 1, wherein a biasing member anchor is mounted in the housing within a first and a second endplate.

16. The flexible link drive apparatus of claim 15, wherein a biasing member is coupled to the biasing member anchor and the adjustable flexible member.

17. The flexible link drive apparatus of claim 1, wherein the input shaft moves the eccentric in a first direction, and the eccentric contacts the adjustable flexible member and applies a tension force to the adjustable flexible member.

18. The flexible link drive apparatus of claim 1, wherein the adjustable flexible member is engaged with the clutch for driving the clutch in a first direction.

19. The flexible link drive apparatus of claim 1, wherein the clutch is coupled to the output shaft and is adapted to engage and drive the output shaft in a first direction, and the clutch engages but does not drive the output shaft in a second direction.

20. The flexible link drive apparatus of claim 1, wherein a biasing member moves the clutch, by way of the adjustable flexible member, in a second direction by a tension force applied to the biasing member by the adjustable flexible member.

21. A method of providing variable speed power transmission by a flexible link drive apparatus, which comprises:
   providing a housing that supports an input shaft and an output shaft; and
   deflecting an adjustable flexible member by an eccentric located on the input shaft which alters a degree of rotation of a clutch located on the output shaft.

* * * * *